United States Patent [19]
Cooke et al.

[11] Patent Number: 5,528,444
[45] Date of Patent: Jun. 18, 1996

[54] AUTOMATIC OVERVOLTAGE PROTECTION FOR AN ALTERNATOR IN A LOCOMOTIVE PROPULSION SYSTEM

[75] Inventors: Philip R. Cooke; Joseph A. Laukaitis, both of Erie, Pa.

[73] Assignee: General Electric Company, Erie, Pa.

[21] Appl. No.: 311,337

[22] Filed: Sep. 23, 1994

[51] Int. Cl.⁶ .................................................. H02H 7/08
[52] U.S. Cl. .............................. 361/20; 361/18; 361/21; 361/115
[58] Field of Search ................................ 361/20, 18, 21, 361/91, 115

[56] References Cited

U.S. PATENT DOCUMENTS

| | | | |
|---|---|---|---|
| 4,486,801 | 12/1984 | Jackovich | 361/21 |
| 5,168,416 | 12/1992 | Bailey et al. | 361/31 |
| 5,206,776 | 4/1993 | Bodenheimer | 361/20 |
| 5,245,495 | 9/1993 | Bailey et al. | 361/23 |

*Primary Examiner*—A. D. Pellinen
*Assistant Examiner*—S. Jackson
*Attorney, Agent, or Firm*—Marvin Snyder

[57] ABSTRACT

A shorted diode protection system for a traction vehicle propulsion system including a synchronous generator having armature and field windings and a bridge rectifier circuit coupling the generator armature windings to a traction motor employs a normally non-conducting solid-state controllable electric valve in parallel with the generator field windings. When a rectifier diode of the bridge rectifier circuit fails short, an a-c current is reflected into the generator field winding circuit. Upon detection of this reflected current, the valve is switched into a conducting state, thereby limiting the voltage on the generator field windings.

15 Claims, 8 Drawing Sheets

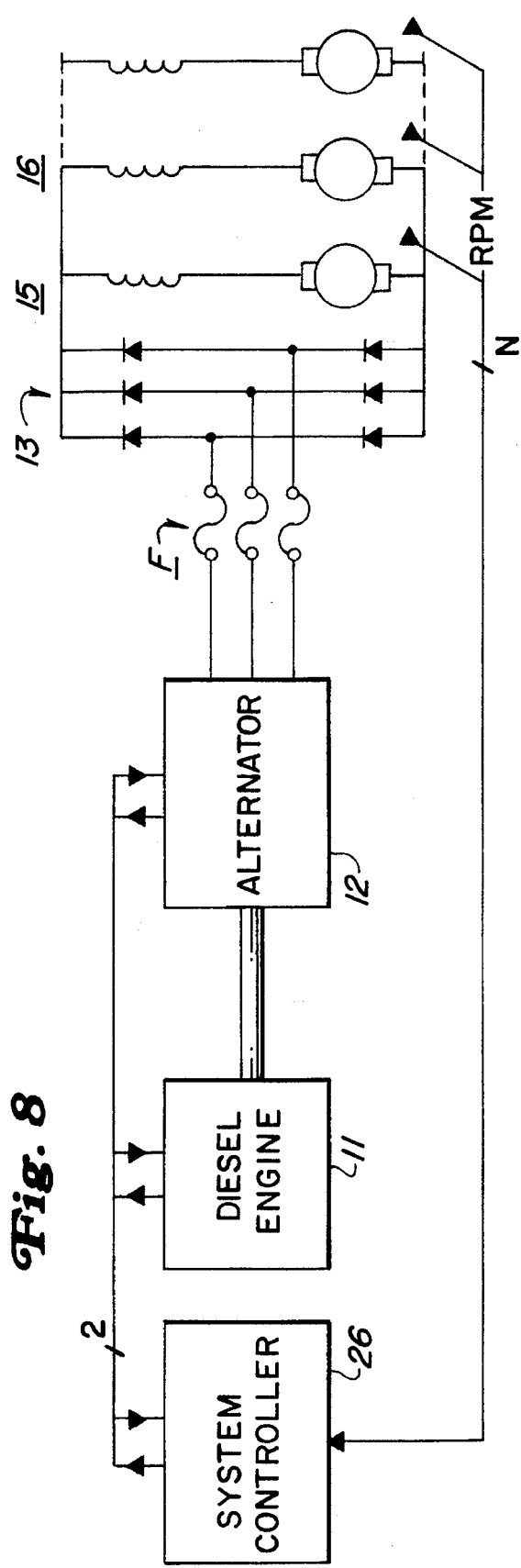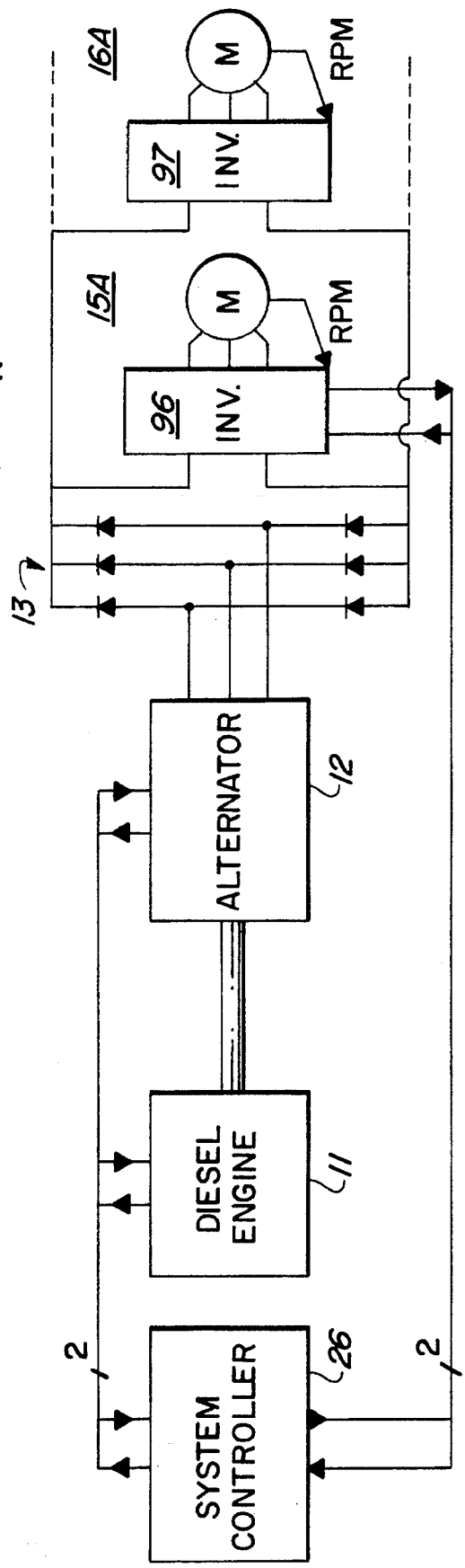

AUTOMATIC OVERVOLTAGE PROTECTION FOR AN ALTERNATOR IN A LOCOMOTIVE PROPULSION SYSTEM

BACKGROUND OF THE INVENTION

This invention relates generally to electrical propulsion systems for traction vehicles (such as diesel-electric locomotives) equipped with either direct current or alternating current traction motors, and it relates more particularly to improved means for protecting such a system from serious damage in the event of an overvoltage reflected onto a field winding of a synchronous generator as a result of a shorted diode in a power rectifier circuit coupled to an output of the generator.

In a modern diesel-electric locomotive, a thermal prime mover (typically a 16-cylinder turbocharged diesel engine) is used to drive an electrical transmission comprising a synchronous generator that supplies electric current to a plurality of electric traction motors whose rotors are drivingly coupled through speed-reducing gearing to the respective axle-wheel sets of the locomotive. The generator typically comprises a main 3-phase traction alternator, the rotor of which is mechanically coupled to the output shaft of the engine. When excitation current is supplied to field windings on the rotating rotor, alternating voltages are generated in the 3-phase armature windings on the stator of the alternator. These voltages are rectified and applied to the armature and/or field windings of the d-c traction motors or inverted to a-c and applied to a-c traction motors.

In normal motoring operation, the propulsion system of a diesel-electric locomotive is so controlled as to establish a balanced steady-state condition wherein the engine-driven alternator produces, for each discrete position of a throttle handle, a substantially constant, optimum amount of electrical power for the traction motors. In practice suitable means are provided for overriding normal operation of the propulsion controls and reducing engine load in response to certain abnormal conditions, such as loss of wheel adhesion or a load exceeding the power capability of the engine at whatever engine speed the throttle is commanding. This response, generally referred to as deration, reduces traction power, thereby helping the locomotive recover from such temporary conditions and/or preventing serious damage to the engine.

In addition, the propulsion control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor armatures are rotating slowly, so their back EMF is low. A low alternator voltage can now produce maximum motor current which in turn produces the high tractive effort required for acceleration. On the other hand, the alternator voltage magnitude must be held constant and at its maximum level whenever locomotive speed is high. At high speeds the traction motor armatures are rotating rapidly and have a high back EMF, and the alternator voltage must then be high to produce the required load current.

In an electric propulsion system, all of the power components (alternator, rectifier, traction motors, and their interconnecting contactors and cables) need to be well insulated to avoid harmful short circuits between the electrically energized parts of these components and ground. The insulation has to withstand very harsh conditions on a locomotive, including constant vibration, frequent mechanical shocks, infrequent maintenance, occasional electrical overloads, a wide range of ambient temperatures, and an atmosphere that can be very wet and/or dirty. If the insulation of a component were damaged, or if its dielectric strength deteriorates, or if moisture or an accumulation of dirt were to provide a relatively low resistance path through or on the surface of the insulation, then undesirably high leakage current can flow between the component and the locomotive frame which is at ground potential. Such an insulation breakdown can be accompanied by ionization discharges or flashovers. The discharge will start before the voltage level reaches its ultimate breakdown value. The dirtier and wetter the insulation, the lower the discharge starting voltage relative to the actual breakdown value. Without proper detection and timely protection, there is a real danger that an initially harmless electrical discharge will soon grow or propagate to an extent that causes serious or irreparable damage to the insulation system and possibly to the equipment itself.

It is conventional practice to provide ground fault protection for locomotive propulsion systems. Such protective systems typically respond to the detection of ground leakage current by overriding the normal propulsion controls and reducing traction power if and when the magnitude of such current exceeds a permissible limit which depends on the magnitude of motor current. See U.S. Pat. No. 4,608,619 and Canadian Pat. No. 1,266,117. Such systems have not been wholly successful in preventing damaging flashovers on the commutators of the traction motors.

In d-c traction motors, carbon brushes rubbing on commutator bars are utilized to provide current to armature windings of the motor. This current establishes a magnetic field in the armature and corresponding magnetic poles. The magnetic poles created in the armature interact with magnetic poles in field windings of the motor to produce torque in the machine. The magnetic poles in the field windings of the motor are established by means of direct current flowing through these windings. The motor includes a plurality of commutator bars equally spaced around one end of the armature, each of the commutator bars being connected to selected windings of the armature for establishing the magnetic poles. As adjacent commutator bars periodically pass under the carbon brushes, the armature coils connected thereto are momentarily short circuited. Since the coils associated with the short circuited commutator bars are displaced from each other, they will be passing through magnetic flux fields created by the magnetic poles of the field windings which are of different magnitudes. Accordingly, a potential difference will exist between the two commutator bars. In the design of an ideal machine the brushes are located between field poles at a point where flux created by the field poles passes through zero in its reversal between adjacent poles of opposite magnetic polarity. This ideal point shifts with changes in armature current since the total flux is the sum of field flux and armature flux. Typically, a commutating pole or interpole is put between adjacent field poles, each commutating pole having a winding which is serially connected in the armature current path so that the flux generated by the commutating pole is proportional to armature current. This method generally serves to minimize changes in the interpole flux thus allowing the brush to transfer current between commutator bars without an undue amount of electrical arcing.

For motors that are subject to heavy overloads, rapidly changing loads, operation with weak main fields, defective brushes, brush bounce, or rough commutators, there is a possibility that the commutating pole action may be insufficient, and a simple sparking at the brushes may become a major arc. For example, at the instant an armature coil is located at the peak of a badly distorted flux wave, the coil voltage may be high enough to break down the air between the adjacent commutator bars to which the coil is connected and result in flashover, or arcing, between these bars. Arcing between commutator segments may quickly bridge adjacent brush holders or spread to the grounded flash ring that usually surrounds the commutator of a d-c traction motor, thereby short circuiting the output lines of the traction alternator. While such flashovers are relatively rare, if one occurs it will usually happen when the locomotive is traveling at a high speed.

Many different systems are disclosed in the relevant prior art for automatically detecting and recovering from flashover conditions. See for example U.S. Pat. No. 4,112,475—Stitt and Williamson. To minimize or avoid serious damage to the traction motor and associated parts of the propulsion system when a flashover occurs, it is desirable to extinguish the flashover before the current being supplied to the faulted motor has time to attain its maximum available short-circuit magnitude. By very rapidly reducing or interrupting such current as soon as the flashover can be detected, the amount of electrical energy in the faulted motor circuit will be kept low enough to prevent permanent damage to the commutator bars, brush holders, and flash ring. This desired high speed flashover protection cannot be obtained by opening the electrical contactor that connects the faulted motor to the rectified output of the alternator, because the opening action of a conventional contactor is too slow and by the time the contactor tips start to separate the fault current magnitude could be so high as to cause undesirable arcing or welding of such tips. The deration function of the propulsion controls cannot be relied on to reduce the initial surge of current that the traction alternator supplies to the faulted motor, because the relevant time constants of the controls and of the alternator field excitation circuit introduce a finite delay between the occurrence of a flashover and the response of the alternator.

Although a-c traction motors do not present the flashover problem of d-c motors, the power system for a-c motors can exhibit a condition, commonly referred to as "shoot-through", which has the same detrimental characteristics of a flashover. In a typical a-c traction motor system, the power output of the traction alternator is supplied to a rectifier circuit which converts the a-c output of the alternator to d-c. This d-c power is then inverted by a solid state inverter into a frequency controlled a-c power for application to the a-c motor. The speed of the a-c motor is controlled by the frequency of the supplied a-c power. The inverter is conventionally arranged to provide 3-phase a-c power and includes a plurality of controllable rectifiers such as silicon controlled rectifiers (SCR) or gate turnoff (GTO) thyristors. Each phase has at least two such devices connected in series between the relatively positive and relatively negative d-c power buses extending from the rectifier circuit. During motoring operation, one of the devices in a phase is always off while the other device is conducting. If both devices were conducting simultaneously, the devices would form a short circuit across the rectifier output buses. Such a condition is referred to as a shoot-through and can result in currents that are of the same magnitude as those which occur during a flashover.

Various failures can contribute to a shoot-through condition. For example, one device may simply fail to commutate off before another device begins conducting. More commonly, one device initially fails to a short-circuit condition and the second device in series with it is gated into conduction resulting in a short circuit between the d-c power buses. As with the flashover fault, the deration function of the propulsion system cannot respond sufficiently fast to prevent damage to the power system.

U.S. Pat. Nos. 5,168,416 and 5,245,495 describe one form of flashover protection circuit for a d-c electric traction motor using a series connected solid state switching device to disconnect the alternator field winding from its power source upon detection of a high current surge characteristic of a flashover. One disadvantage of this system is that the series switching device, e.g., a GTO, must be sized to carry alternator field current during normal system operation. Further, the series device requires forced air cooling to prevent overheating and its stress level is high due to the continuous current it must carry.

As discussed above, the 3-phase synchronous generator in a locomotive propulsion system develops an output voltage which is a function of its rotor shaft RPM and the d-c voltage and current applied to its field windings. The 3-phase output is converted to d-c power by a 3-phase full bridge rectifier connected to the generator armature windings. This rectifier contains fuses which function as protective devices to protect the alternator from overvoltages caused by failure of a device in the rectifier. The devices are typically solid-state diodes and fail to a "short-circuit" condition. In a d-c electric traction motor system, the d-c power is coupled directly to the traction motors. In an a-c motor system, the d-c power is applied to an inverter and inverted to a controlled frequency power.

Both a-c and d-c locomotives require protection for rectifier short-circuit failures and such protection has normally been provided by fuses. The fuses are often a maintenance problem, since they last only about 3.27 years in the most severe locomotive conditions (e.g., pulling coal up a steep grade; i.e. low speed, maximum power, and at the highest output rectifier currents). When a fuse blows the locomotive has to operate at a reduced horsepower or none at all (depending on if it is a d-c or an a-c locomotive). Accordingly, it is desirable to provide a protection system which does not use fuses.

SUMMARY OF THE INVENTION

A general objective of the present invention is to provide improved protection for a locomotive propulsion system experiencing a failed rectifier and an output circuit of a power alternator.

A more specific objective of the present invention is to provide a shorted diode protection system which protects an alternator or synchronous generator in a locomotive propulsion system from an overvoltage condition caused by reflected a-c voltages on the field winding of the generator as a result of a shorted diode in the output rectifier connected to the armature of the generator.

In one form, the shorted diode protection system of the present invention is disclosed in an application for a traction vehicle propulsion system including at least one electric traction motor, a synchronous generator having armature and field windings, a controllable source of excitation current connected to the field windings, and electric power conditioning means interconnecting the armature windings to the traction motor. The power conditioning means include a bridge rectifier circuit converting alternating current from the armature windings to direct current on a pair of relatively positive and negative output buses. The protection system includes detecting means for producing a false signal in response to a reflected alternating current voltage appearing on the field windings in excess of a preselected magnitude, the magnitude being selected to limit the reflected voltage on the alternator field windings to a value low enough to prevent damage to the windings due to insulation breakdown. The system further includes at least one solid-state controllable electric valve connected in parallel circuit arrangement with the field windings, the valve being normally non-conducting and being switchable to a conducting state by a gating signal applied to a gate terminal. Means responsive to the false signals supplies the gating signal to the valve to limit the voltage on the field winding by gating the valve into conduction when the a-c voltage reflected to the field winding exceeds the preselected magnitude.

The shorted diode protection system preferably includes a second controllable solid-state electric valve connected in parallel with the at least one valve and arranged so that the valves are connected in inverse conducting relationship. In this manner, the system can detect either a positive or a negative voltage on the field winding and energize an appropriate one of the valves to short circuit the voltage regardless of polarity. Preferably, each of the valves comprises a silicon control rectifier or SCR. The system further includes a thyrite connected in parallel with the field winding for dissipating transient voltages appearing on the field winding that are less than the preselected magnitude.

In one embodiment, the detecting means comprises a solid-state rectifier circuit coupled to the field winding and adapted to produce a d-c voltage output proportional to the a-c voltage component on the field windings due to the short circuit of the rectifier on the generator output. A trigger circuit produces a trigger pulse when the d-c voltage exceeds a preselected value and the trigger pulse is applied to an SCR gate signal generating circuit to produce gate signals for the time duration of the trigger pulse. The trigger circuit may comprise a monostable multivibrator connected to a comparator with the comparator having input terminals connected to the output of the field winding rectifier circuit. The multivibrator generates a trigger pulse having a predetermined time duration such as, for example, 1 second. The pulse output of the multivibrator is then applied to the SCR gate pulse circuit to cause a generation of a gate pulse to the SCRs for the time duration of the pulse output from the multivibrator. The excitation current source for the alternator field windings includes a current sense ($I_F$) which operates a current limit protection embodied in the system controller and causes a phase back of the gate firing signals to the SCR's in the excitation current source to reduce current supplied to the short circuit formed by SCR's across the field winding. This assures that the excitation current source is not damaged during the time that the SCRs are coupled in parallel with the field winding for reducing the voltage applied to the winding.

In still another embodiment, the shorted diode protection system is incorporated in circuit with a fault current detection system which detects an overcurrent condition caused by a shoot-through of a inverter system in an a-c locomotive or flashover of a d-c motor in a d-c powered traction vehicle. The fault current system includes means connected in circuit with the synchronous generator field winding for commutating off the controllable source of excitation current upon detection of a fault current condition. Thereafter means are selectively connected in circuit with the field winding for dissipating energy in the field winding subsequent to commutation of set of excitation source. The system includes means for inhibiting operation of the fault signal responsive means upon detection of the fault current so that the SCRs of the shorted diode protection system are not gated into conduction during a time period when the fault current in the field winding is being dissipated.

The invention further includes the method of protecting a synchronous generator from a reflected overvoltage condition by coupling a rectifier circuit across the field winding for developing an output voltage representative of an alternating current voltage on the field winding, detecting when the alternating current voltage exceeds a preselected maximum magnitude in generating a false signal in response thereto and short circuiting the field winding in response to the false signal. The method further includes the step of short circuiting the field winding by connecting a solid-state controllable electric switch in parallel with the field winding and gating the switch into conduction for a predetermined time duration. In the form wherein the switch comprises a pair of inversely connected SCRs, the step of gating preferably comprises applying gate pulses to gate terminals of the SCRs for the predetermined time duration of the false signal. The inventive method further includes the steps of monitoring the armature windings for an overcurrent condition, connecting commutating means across the field windings in response to a monitored overcurrent and inhibiting application of gate pulses to the SCR's during the overcurrent condition.

BRIEF DESCRIPTION OF THE DRAWINGS

For a better understanding of the present invention, reference may be had to the following detailed description taken in conjunction with the accompanying drawings in which:

FIG. 8 is a simplified illustration of a propulsion system for a d-c electric motor driven locomotive;

FIG. 9 is a simplified illustration of a propulsion system for an a-c electric motor driven locomotive;

DETAILED DESCRIPTION OF THE INVENTION

Figure 1:
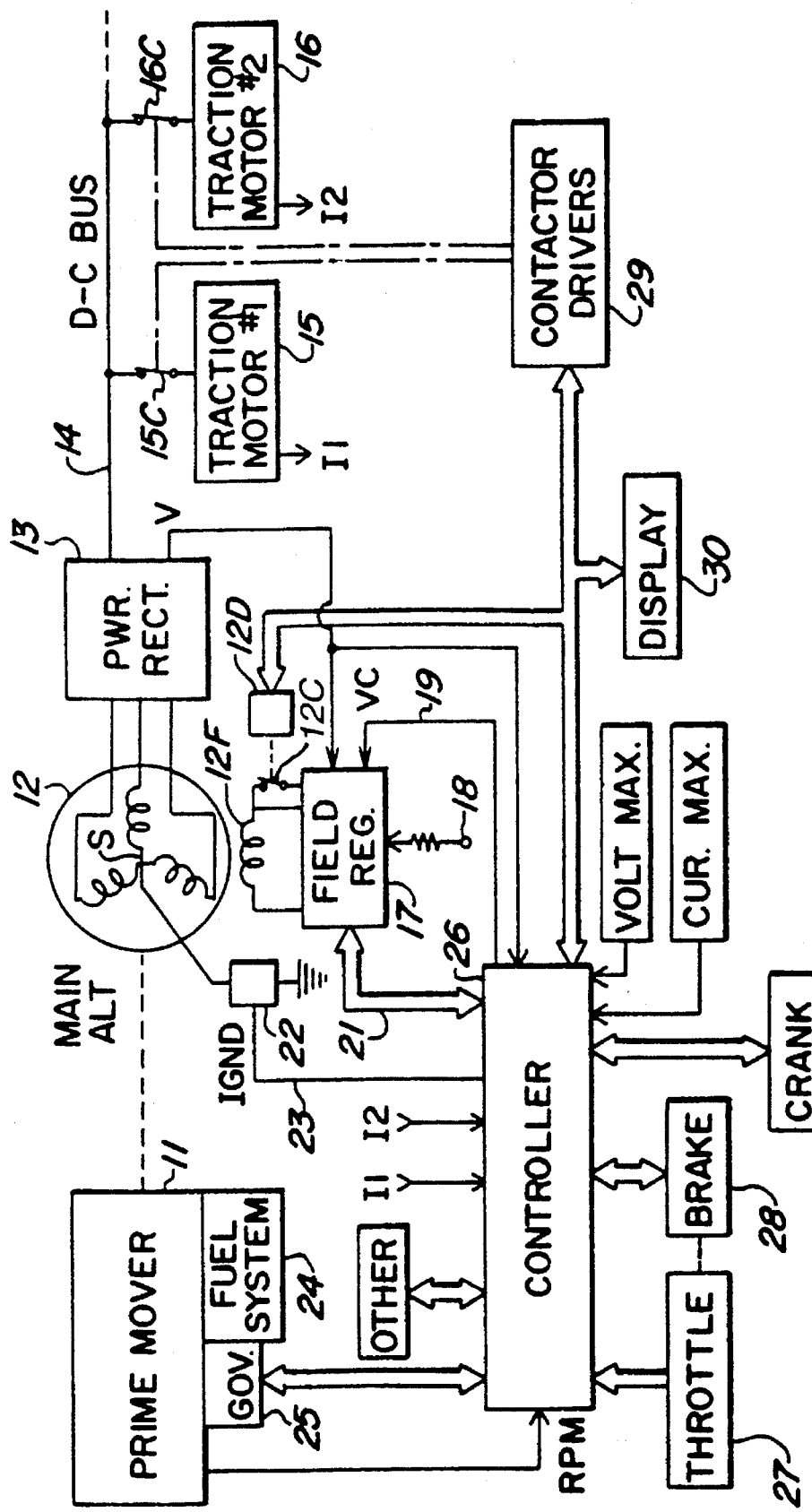
FIG 1 is a block diagram of an electrical propulsion system for a locomotive, including a thermal prime mover (such as a diesel engine), a synchronous generator, an electric power rectifier, a plurality of traction motors, a controllable source of excitation current, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The main alternator 12 has a set of three Y-connected armature windings on its stator. In operation, it generates 3-phase voltages in these windings, which voltages are applied to a-c input terminals of at least one 3-phase, full-wave uncontrolled power rectifier bridge 13. In a conventional manner, the bridge 13 is formed by a plurality of pairs of power diodes, two or three such pairs being associated with each of the three different phases of the main alternator 12. The diodes in each pair are serially connected between relatively positive and negative direct current (d-c) output terminals of the rectifier bridge, and their junction is connected via a protective fuse (not shown) to the respectively associated a-c input terminal of the bridge. The output of the bridge 13 is electrically coupled, via a d-c bus 14 and a plurality of individual electrical contactors 15C, 16C, in energizing relationship to a plurality of parallel-connected, adjustable speed d-c traction motors, only two of which (15,16) are shown in FIG. 1. Prime mover 11, alternator 12, and rectifier 13 are suitably mounted on the platform of a self-propelled traction vehicle which typically is a 4-axle or 6-axle diesel-electric locomotive. The locomotive platform is in turn supported on two trucks (not shown), each having two or more axle-wheel sets. A separate traction motor is hung on each axle, and its rotor is mechanically coupled via conventional gearing in driving relationship to the associated axle-wheel set. Suitable current sensing means are used to provide a family of current feedback signals I1,I2, etc. that are respectively representative of the magnitudes of the motor armature currents.

Figure 2A:
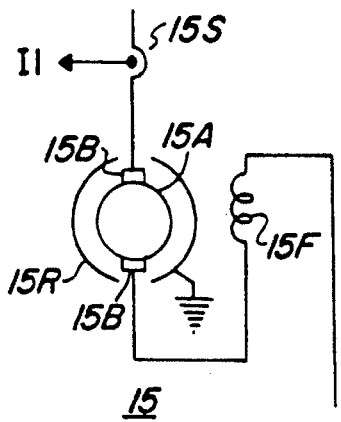
FIG. 2A is a schematic diagram of one of the d-c traction motors represented by simple blocks in FIG. 1.

The first traction motor 15 is shown in FIG. 2A and is typical of the others. On the cylindrical rotor of this motor there are a plurality of armature windings that respectively terminate at different bars or segments of a conventional commutator 15A with which non-rotating carbon brushes 15B are in sliding contact. A grounded flash ring 15R is positioned around the commutator in spaced relation thereto. The motor has field windings 15F on its stator, and during the motoring or propulsion mode of operation these windings are electrically connected in series with the armature as is shown in FIG. 2A. The direction of armature rotation, and hence the direction in which the locomotive is propelled, depends on the relative direction of field current and can be reversed by changing the contact position of a conventional bistable electromechanical reverser (not shown) connected in series with the field windings 15F. For dynamically braking or retarding the locomotive the armature windings of each traction motor are disconnected from the power rectifier 13 and reconnected to a conventional fan-blown dynamic braking resistor grid (not shown), and the field windings of all of the motors are reconnected in series with each other for energization by the rectified output of the main alternator 12. As can be seen in FIG. 2A, the current feedback signal I1 is provided by a suitable current sensor 15S connected in series with the armature windings of the traction motor 15. It is therefore representative of the magnitude of current in the series-connected armature and field windings of this motor when operating in a motoring mode.

The main alternator 12 and the power rectifier 13 serve as a controllable source of electric power for the respective traction motors. The magnitude of output voltage (or current) of this source is determined and varied by the amount of excitation current supplied to field windings 12F on the rotor of the main alternator. These field windings are connected for energization to the output of a suitable source 17 of regulated excitation current IF. In the illustrated embodiment of the invention, the connection between the field windings 12F and the excitation current source 17 include a contact 12C of a conventional electromechanical field switch. The field switch has control means 12D for moving it to a first or normal state, in which the contact 12C is closed and freely conducts excitation current, and for causing this switch to change between its first state and a second or alternative state, in which the contact 12C is open and excitation current is effectively interrupted. In practice the control means 12D comprises an electromagnetic coil and an associated actuating mechanism that will move the field switch to its normal state and hold it there only if this coil is energized.

Figure 2B:
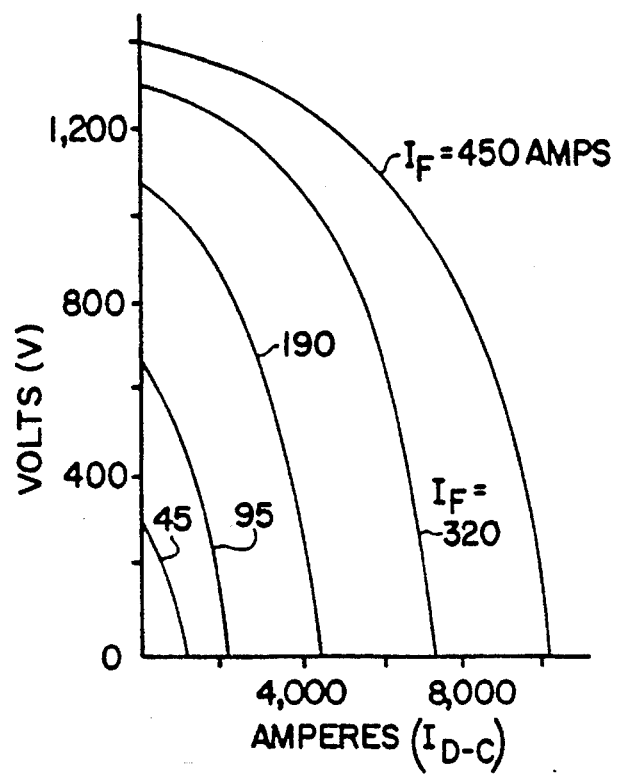
FIG. 2B is a family of load saturation curves of a typical synchronous generator, showing the relationship between output voltage and current for various magnitudes of excitation current.

Preferably the excitation current source 17 comprises a 3-phase controlled rectifier bridge the input terminals 18 of which receive alternating voltages from a prime mover-driven auxiliary alternator that can actually comprise an auxiliary set of 3-phase armature windings on the same frame as the main alternator 12. The source 17 is labeled "Field Regulator" in FIG. 1. It includes conventional means for varying the magnitude of direct current IF supplied to the alternator field 12F (and hence the output of the alternator 12) as necessary to minimize any difference between the value of a variable control signal VC on an input line 19 and a feedback signal which during motoring is representative of the average magnitude V of the rectified output voltage of the main alternator 12. The latter voltage magnitude is a known function of the magnitude of excitation current in the field windings 12F and the magnitude of output current in the armature windings of the main alternator, respectively, and it also varies with the speed of the prime mover 11. It is sensed by a conventional voltage sensing module connected across the d-c output terminals of the power rectifier. The curves in FIG. 2B illustrate exemplary relationships between V and the average magnitude of load current at the output terminals of the power rectifier 13 as supplied by a typical alternator 12 driven at constant speed (e.g., 1050 RPM) by the prime mover 11 and excited by field current IF of various different magnitudes which are labeled on the respective curves.

A current detecting module 22 of relatively low resistance (e.g., approximately ten ohms) is connected between the neutral S of the alternator armature windings and the grounded chassis or frame of the locomotive, as indicated in FIG. 1. The module 22 provides on an output line 23 a feedback signal representative of the magnitude (IGND) of ground leakage current in the electric propulsion system. It will be apparent that IGND is a measure of current flowing, via the module 22, between the neutral S and any ground fault in the armature windings of the main alternator 12, in the power rectifier 13, or in the electric load circuit that is connected to the power rectifier. The latter circuit includes the field windings of the traction motors 15,16, etc. and, in the motoring mode of operation, the motor armature windings as well.

The prime mover 11 that drives the alternator field 12F is a thermal or internal-combustion engine or equivalent. On a diesel-electric locomotive, the motive power is typically provided by a high-horsepower, turbocharged, 16-cylinder diesel engine. Such an engine has a fuel system 24 that includes a pair of fuel pump racks for controlling how much fuel oil flows into each cylinder each time an associated fuel injector is actuated by a corresponding fuel cam on the engine camshafts. The position of each fuel rack, and hence the quantity of fuel supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed call signal received from an associated controller 26, which signal is herein called the speed command signal or the speed call signal. An engine speed signal (RPM) indicates the actual rotational speed of the engine crankshaft and hence of the alternator field.

The speed command signal for the engine governor system 25 and the excitation control signal VC for the alternator field current source 17 are provided by the controller 26. In a normal motoring or propulsion mode of operation, the values of these signals are determined by the position of a handle of a manually operated throttle 27 to which the controller 26 is electrically coupled. A locomotive throttle conventionally has eight power positions or notches (N), plus idle and shutdown. N1 corresponds to a minimum desired engine speed (power), while N8 corresponds to maximum speed and full power. With the throttle in its idle position, the controller 26 is operative to impose on the control signal VC a value corresponding to IF=O, and no traction power is produced by the main alternator 12. When dynamic braking of a moving locomotive is desired, the operator moves the throttle handle to its idle position and manipulates an interlocking handle of a companion brake control device 28 so that the main controller 26 is now supplied with a variable "brake call" signal that will determine the value of the alternator excitation control signal VC. (In the braking mode, a feedback signal which is representative of the magnitude of the current being supplied to the traction motor field windings from the rectified output of the main alternator 12 will be supplied to the alternator excitation source 17 and there subtracted from the control signal on line 19 to determine the difference or error signal to which the source 17 responds.) In a consist of two or more locomotives, only the lead unit is usually attended, and the controller onboard each trail unit will receive, over trainlines, encoded signals that indicate the throttle position or brake call selected by the operator in the lead unit.

For each power level of the engine there is a corresponding desired load. The controller 26 is suitably arranged to translate the notch information from the throttle 27 into a reference signal value substantially equal to the value that the voltage feedback signal V will have when the traction power matches the called-for power, and so long as the alternator output voltage and load current are both within predetermined limits the control signal VC on the input line 19 of the excitation current source 17 is varied as necessary to obtain this desired load. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine.

As is illustrated in FIG. 1, the controller 26 receives the above-mentioned engine speed signal RPM, voltage feedback signal V, and current feedback signals I1,I2, etc. which are representative, respectively, of the magnitudes of current in the armature windings of the individual traction motors. It also receives a load control signal issued by the governor system 25 if the engine cannot develop the power demanded and still maintain the called-for speed. (The load control signal is effective, when issued, to reduce the power reference value in the controller 26 so as to weaken the alternator field until a new balance point is reached.) Additional data supplied to the controller 26 include: "VOLT MAX" and "CUR MAX" data that establish absolute maximum limits for the alternator output voltage and current, respectively; "CRANK" data indicating whether or not an engine starting (i.e., cranking) routine is being executed; and relevant inputs from other selected sources, as represented by the block labeled "OTHER." The alternator excitation source 17 and the controller communicate with each other via a multiline serial data link or bus 21. The controller 26 also communicates with the control means 12D that is operative, when energized in response to a "close" command from the controller, to move the field switch contact 12C to its closed position in which it is held by the energized control means, and it communicates with "CONTACTOR DRIVERS" (block 29) which are suitably constructed and arranged to actuate the individual traction motor contactors 15C, 16C, etc. Typically the contactor drivers 29 are pneumatic mechanisms controlled by associated electromagnetic values which in turn are controlled, selectively or in unison, by commands from the controller 26.

For the purpose of responding to ground faults in the propulsion system, the controller 26 is supplied, via the output line 23 of the current detecting module 22, with the aforesaid feedback signal whose value varies with the magnitude IGND of ground leakage current. If this signal indicates that IGND is abnormally high, the controller automatically executes certain protective functions and, at the same time, sends appropriate messages or alarm signals to a display module 30 in the cab of the locomotive. Preferably the ground fault protective functions implemented by the controller 26 are the same as or equivalent to those disclosed in the previously cited prior art Canadian patent 1,266,117 granted on Feb. 20, 1990, and assigned to General Electric Company, and the disclosure of that patent is expressly incorporated herein by reference. In summary, the referenced protection is effective to modify the value of the control signal VC on line 19 when ground leakage current is abnormally high so that (1) if the ground current magnitude is in a range between a predetermined deration threshold level and a predetermined maximum permissible limit, the magnitude of alternator field current IF is reduced and consequently the power output of the main alternator 12 is reduced to a fraction of its normally desired amount, which fraction varies inversely with the magnitude of ground current in excess of the deration threshold level, and (2) the power output is restricted to zero for at least a minimum interval of time if the ground current magnitude increases above its maximum limit.

In the preferred embodiment of the present invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, a central processing unit (CPU) executes an operating program stored in an erasable and electrically reprogrammable read only memory (EPROM) which also stores tables and data utilized in the program. Contained within the CPU are conventional counters, registers, accumulators, flipflops (flags) etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The controller 26 is programmed to produce, in the motoring mode of operation, a control signal value on the line 19 that varies as necessary to zero any error between the value of the alternator voltage feedback signal V and a reference value that normally depends on the throttle position selected by the locomotive operator and the traction power output of the main alternator. The presently preferred manner in which this is accomplished is disclosed in U.S. Pat. No. 4,634,887—Balch et al, issued Jan. 6, 1987, and assigned to General Electric Company, which disclosure is expressly incorporated herein by reference. In order to implement an electrical braking mode of operation, the controller 26 is programmed to vary the value of the control signal VC as necessary to zero any error between a motor armature current feedback value and a reference value that normally depends on the dynamic brake position selected by the locomotive operator.

In accordance with the present invention, the above-described propulsion system includes means for protecting the traction motors from flashovers. The desired flashover protection is implemented by the controller 26 in cooperation with the main alternator excitation current source 17. The parts of the controller that are involved in flashover protection are shown in simplified form in FIG. 3 where the block 32 represents suitable means for detecting the occurrence of a flashover on the commutator of any one of the d-c traction motors 15,16,etc.

The detecting means 32 receives the family of traction motor current feedback signals I1,I2,etc. and the ground leakage current (IGND) feedback signal on line 23. It is operative to produce a fault signal on an output line 33 (labeled "FAULT" in FIGS. 3–7) whenever a flashover occurs, as indicated by an abnormal rise in the magnitude of at least one current feedback signal in the event either (1) the magnitude of armature current in any traction motor exceeds a predetermined threshold which is higher than the magnitude of armature current under all normal conditions, or (2) the magnitude of IGND exceeds another threshold (e.g., 2.5 amperes) which is higher than the maximum permissible limit of leakage current above which the above-mentioned ground fault protective function clamps the control signal VC to its zero traction power value. The threshold magnitude of motor armature current is preferably nearly twice the maximum current that each traction motor will normally conduct; in one practical application of the invention, a threshold magnitude of 3,000 amperes has been selected. In order to respond as quickly as possible to the occurrence of a flashover, the detection function is preferably performed by means of analog circuitry rather than by the microcomputer.

Figure 4:
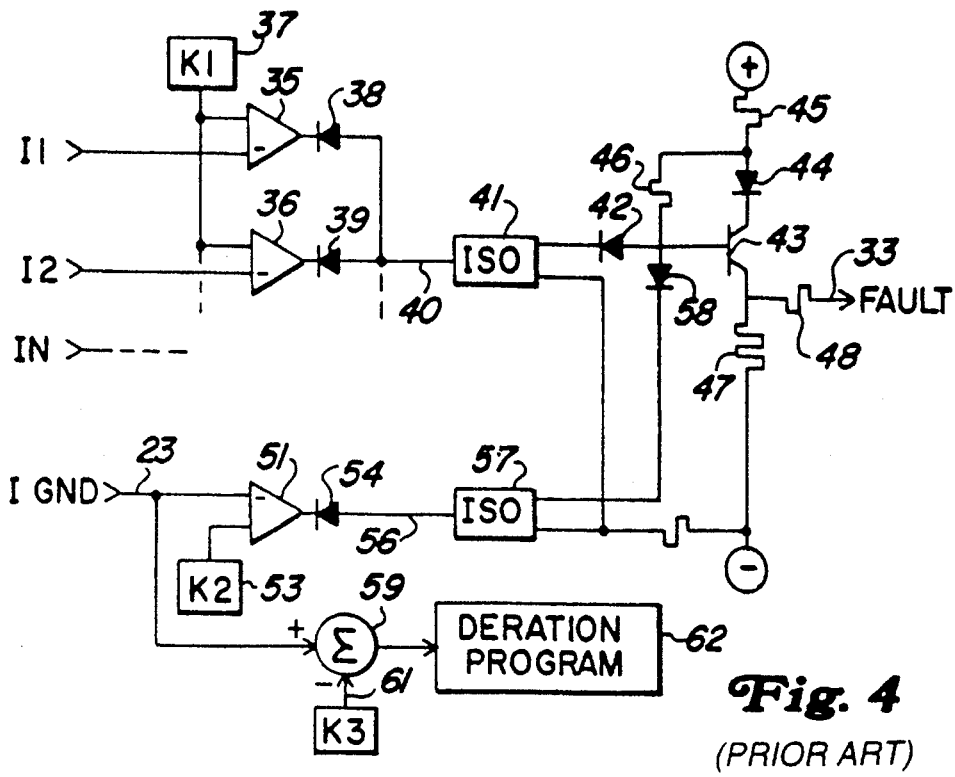
FIG. 4 is a schematic circuit diagram of the flashover detecting means shown as a single block in FIG. 3.

The presently preferred embodiment of the fault current detection means 32 is shown in FIG. 4 and will now be described. In a d-c traction motor propulsion system, the motor armature current feedback signals I1,I2, etc. are respectively supplied to first inputs of an array of comparators 35,36,etc. In an a-c traction motor propulsion system, the signals I1, I2 . . . IN are derived from current sensors coupled in circuit with inverters supplying variable frequency power to the motors. The second inputs of the same comparators are connected in common to suitable means 37 for deriving a bias signal of predetermined constant magnitude K1 corresponding to the aforesaid high threshold magnitude of motor current. The outputs of these comparators are respectively coupled through diodes 38,39, etc. to a line 40 which in turn is connected through a buffer 41 and another diode 42 to the base of a PNP transistor 43. The emitter of the transistor 43 is connected via a diode 44 and a resistor 45 to a control voltage bus (+) of relatively positive constant potential, and a resistor 46 is connected between the transistor base and the junction of the diode 44 and resistor 45. The collector of the transistor 43 is connected via a resistor 47 to a reference potential bus represented in FIG. 4 by a circled minus symbol, and it is also connected via a resistor 48 to the output line 33 of the flashover detector. Normally, none of the feedback signals I1,I2, etc. has a magnitude exceeding K1, all of the comparators 35,36,etc. have high outputs, the diodes 38,39,etc. are reverse biased (i.e., non-conducting) and the signal on the line 40 is high, the transistor 43 is turned off, there is no current in resistor 47, the potential of the transistor's collector (and also of the line 33) is low or zero with respect to the reference potential, and no fault signal is being outputted by this detector. However, if and when any one (or more) of the motor current feedback signals rises above K1, the output of the associated comparator will switch to a low state which causes the signal on line 40 to be low and the diode 42 to conduct, thus forward biasing the emitter-base junction of the transistor 43 which now turns on and conducts current through its collector resistor 47, thereby raising the collector potential and producing a high fault signal on the output line 33.

As can be seen in FIG. 4, the current feedback signal on line 23, representing the magnitude of ground leakage current IGND in the armature windings of the traction alternator 12, is supplied to one input of an additional comparator 51, the other input of which is connected to suitable means 53 for deriving another bias signal of predetermined constant magnitude K2 corresponding to the aforesaid high threshold magnitude of IGND. The output of comparator 51 is coupled through a diode 54 to a line 56 which in turn is connected through a buffer 57 and a diode 58 to the base of the transistor 43. Normally the magnitude of the ground current feedback signal does not exceed K2, the comparator 51 has a high output, the diode 54 is reverse biased (i.e., non-conducting), and the signal on the line 56 is high. However, if and when the magnitude of this feedback signal rises above K2, the output of comparator 51 is switched to a low state which causes the signal on line 56 to be low and the diode 58 to conduct, thereby turning on the transistor 43 and producing a high fault signal on the output line 33. In effect, the diodes 42 and 58 form an "OR" logic circuit which enables the detector to produce a fault signal in response to an abnormal magnitude increase of either the ground leakage current in the alternator armature windings or the armature current in any one of the traction motors, such increase being caused in either case by a flashover on a motor commutator.

As is shown in FIG. 4, the ground leakage current feedback signal on line 23 is also supplied to summing means 59 where another signal on a line 61 is subtracted therefrom. The signal on line 61 has a predetermined constant magnitude K3 and corresponding to the deration threshold level of IGND (e.g., approximately 0.5 ampere). If IGND is higher than this level, the resultant value from the summing means 59 activates a deration program 62. As is fully disclosed in the previously cited Canadian patent 1,266,117, the deration program 62 modifies the value of the control signal VC on the line 19 (see FIG. 1) in a manner that reduces the magnitude of alternator field current so that the power output of the alternator 12 is reduced to a fraction of its normally desired amount, which fraction is inversely proportional to the magnitude of leakage current in excess of the deration threshold level, and equals zero if the leakage current magnitude exceeds its maximum permissible limit (e.g., approximately one ampere). Note that K2 is higher than the magnitude of the feedback signal on line 23 when the last-mentioned limit is reached.

Returning to FIG. 3, the fault signal that the detecting means 32 produces on the output line 33 whenever a flashover occurs is supplied to the alternator excitation current source 17 via the data link 21. In accordance with the present invention, the excitation source 17 is provided with a solid-state controllable electric valve and a series connected capacitor coupled in parallel circuit arrangement with the alternator field windings 12F for quickly commutating off the field current source and rapidly reducing the magnitude of field excitation current when the valve is gated into conduction by a fault current signal thereby correspondingly decreasing the magnitude of the output voltage of the main alternator 12. The organization, operation, and advantages of this part of the flashover protection means will now be described in more detail with reference to FIG. 5 which illustrates the presently preferred embodiment of the excitation current source 17 for a d-c electric traction motor system. The illustrated source 17 comprises a 3-phase double-way rectifier bridge 64 formed by the interconnection of six controllable, unidirectional electric valves or thyristors having gates which respectively receive periodic firing or turn-off signals from conventional control means 65 shown as a block labeled "thyristor bridge control," such firing signals being synchronized with 3-phase alternating voltages that are applied to three a-c input lines 18 of the bridge 64. The latter voltages are obtained from auxiliary windings of the alternator 12, whereby their frequency and amplitude will vary with the rotational speed (RPM) of the prime mover. Typically the input voltage magnitude is in a range from approximately 30 volts rms at idle speed to 68 volts rms at full speed. In order to achieve the desired alternator field regulation as previously described, the control means 65 is operative to advance or to retard the timing of the firing signals as a function of any error between the control signal VC on line 19 and the feedback signal representative of the alternator output voltage V.

Figure 5:
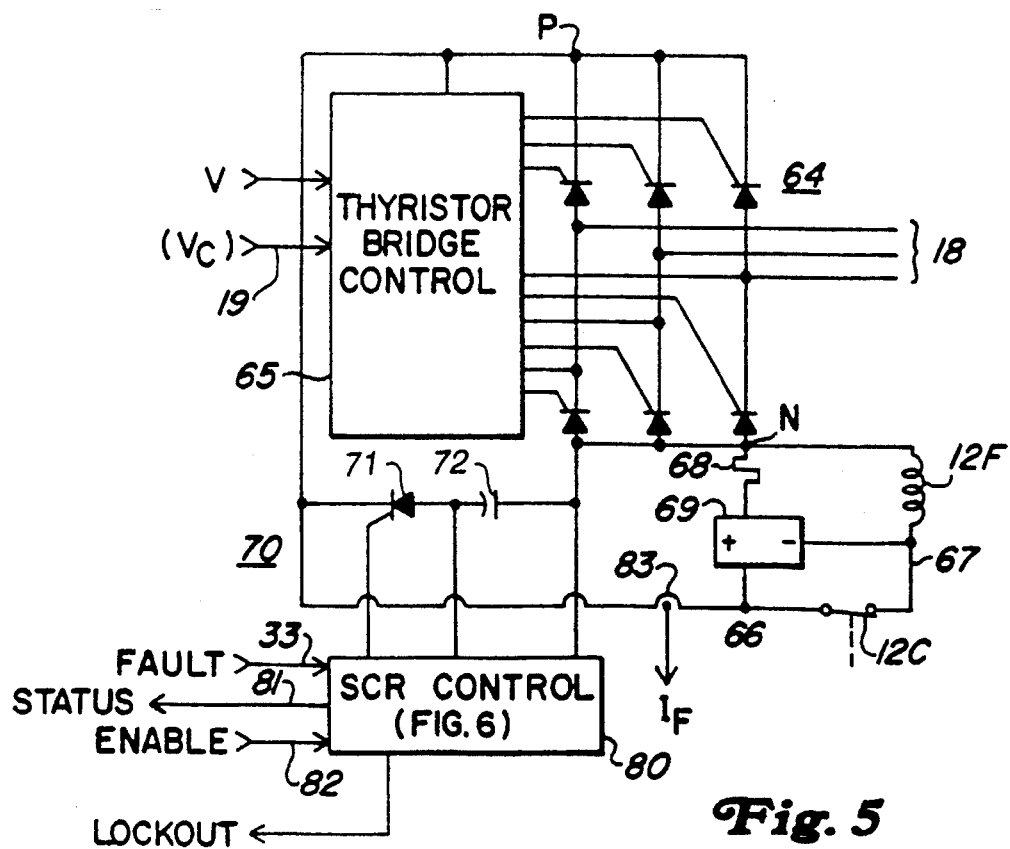
FIG. 5 is an expanded diagram of the generator excitation current source shown as a single block in FIGS. 1 and 3 for a d-c electric traction motor.

As is shown in FIG. 5, the negative d-c output terminal N of the rectifier bridge 64 is connected directly to one end of the field windings 12F of the main alternator, and the relatively positive output terminal P of this bridge is connected to the other end of the field 12F by means of a line 66, the normally closed contact 12C of the alternator field switch, and a line 67. The field 12F and the contact 12C are shunted by a voltage limiting resistor 68 of relatively small ohmic value (e.g., two ohms), in series with a bipolarity voltage breakover device 69 having a positive terminal connected to the line 66 and a negative terminal connected to the line 67. The breakover device 69 in its normal state provides a very high resistance and is essentially an open circuit. However, it is suitably constructed and arranged to switch abruptly to a negligible resistance state if either the potential of line 67 is negative and exceeds a first predetermined breakover level with respect to output terminal N of the bridge 64 (e.g., 800 volts) or the potential of line 66 is relatively positive and exceeds a second breakover level which can equal or differ from the first breakover level. So long as the device 69 is in the latter state, any excitation current in the field 12F will circulate or "free wheel" through the 2-ohm resistor 68.

The field excitation system of FIG. 5 is particularly adapted for a propulsion system for a locomotive employing d-c electric traction motors and includes a controllable circuit means 70 connected in parallel with the field winding 12F and with the thyristor bridge 64 between negative d-c output terminal N and relatively positive output terminal P. In the illustrative embodiment of the invention, the circuit means 70 comprises a relatively high speed controllable electric valve 71 connected in series with a relatively large, e.g., 420 μF, capacitor 72 between terminals N and P. The valve 71 is preferably an SCR.

Whenever a fault current is detected as evidenced by an abnormally high value of current I1, I2, etc. to one of the traction motors, the circuit of FIG. 4 generates a fault current signal FAULT which is coupled to SCR control 80. SCR control 80 is operative in response to a FAULT signal to gate SCR 71 into conduction and at the same time to change a normally high ("1") STATUS signal on an output line 81 to a low ("0") state. The SCR control 80 further includes means for charging capacitor 72 to a relatively high voltage with respect to the output voltage of rectifier bridge 64. In one exemplary embodiment, the normal voltage from the bridge 64 measured across field winding 12F is in the range of about 30–40 volts whereas the voltage to which capacitor 72 is charged is about 440 vdc. A more detailed description of the SCR control 80 is given below with respect to FIG. 6.

Figure 7:
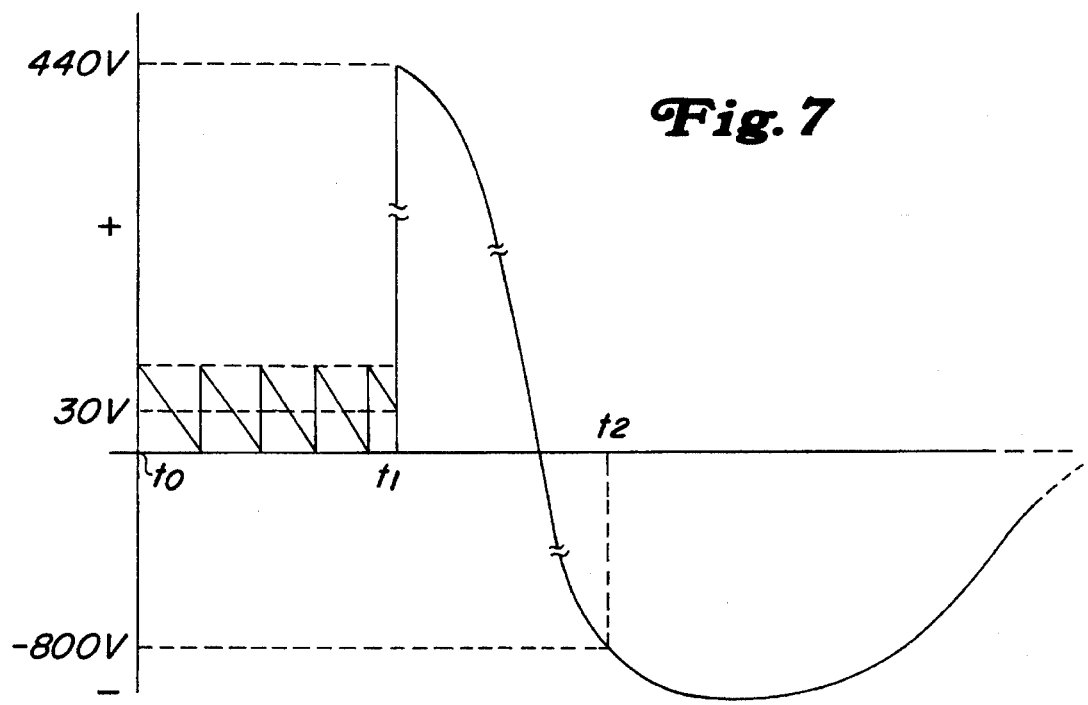
FIG. 7 illustrates a typical waveform of voltage on the generator field winding during operation of the fault current protection system.

When SCR 71 is gated into conduction, capacitor 72 is coupled in parallel with field winding 12F between rectifier terminals N and P. Capacitor 72, charged to a much higher voltage than the rectifier output, reverse biases the SCR's in rectifier 64 and becomes the current source for current into field winding 12F. In an exemplary system, it has been found that rectifier 64 can be commutated off within microseconds with the voltage on capacitor 72 ringing to a reverse polarity of about 800 volts within one to two milliseconds. When the reverse voltage reaches about 800 volts, the breakover device 69 is triggered into conduction coupling resistor 68 in parallel with field winding 12F. Current in field winding 12F rapidly decays to zero by dissipation in resistor 68 thereby reducing the power output of the alternator to zero within the same time interval. An exemplary voltage waveform for field winding 12F is shown in FIG. 7. The voltage from time $t_0$ to $t_1$ is a conventional phase controlled output voltage from SCR bridge rectifier 64 having an average d-c value of about 30 volts. At time $t_1$, a fault current is sensed and SCR 71 gated into conduction. The voltage across winding 12F immediately jumps to the value of voltage on capacitor 72, in this example, a value of 440 volts. At the same time, the gate signals to the SCR's in 64 are turned off for two seconds. Current to winding 12F concurrently transfers from rectifier 64 to capacitor 72 thereby commutating the SCR's in rectifier 64 to a non-conductive state. The current circulates through winding 12F and capacitor 72 charging capacitor 72 in a reverse polarity. When the voltage across capacitor 72 (and winding 12F) reaches a magnitude sufficient to trip breakover device 69, resistor 68 is coupled in parallel with winding 12F thereby providing a low impedance for absorbing the energy in winding 12F so that its current rapidly decays to zero. In the example, device 69 trips at about −800 volts at time $t_2$ approximately one to two milliseconds after the fault is detected. Current in winding 12F decays to about zero within about 168 milliseconds. From time $t_1$ to time $t_2$, the circuit operates in an underdamped mode and then, at time $t_2$, switches to an overdamped mode.

The reduction in field current magnitude causes a much larger current reduction in the armature windings of the main alternator 12, and the alternator output voltage and current rapidly decrease. FIG. 2B demonstrates that the alternator output current decrease, per ampere of field current reduction, varies from approximately five amperes to nearly 15 amperes, depending on the magnitude of alternator output voltage V. The advantageous results of quickly shunting the field winding with a low impedance and decoupling the rectifier bridge 64 from the alternator field 12F will be better understood from the following explanation of the alternator's response to flashovers.

The main alternator 12 is a high-reactance, salient-pole synchronous machine without damping or amortisseur windings. If the load circuit connected to the output terminals of the armature windings of this machine were short-circuited by a flashover, the amplitude of armature current would tend to increase abruptly to a peak much higher than normal and then to decay with time. The initial current increase in the armature windings produces magnetomotive force (MMF) that almost directly opposes the field MMF, whereby tending to demagnetize or weaken the resultant magnetic field in the stator-rotor air gap of the machine. The demagnetizing MMF induces extra current in the field 12F so that the total flux linkages will remain constant. The control means 65 for the controlled rectifier bridge 64 in the excitation current source 17 responds to the resulting change in output voltage V by initiating corrective action, but its response time is too slow and the bridge 64 has insufficient voltage to prevent this field current increase. So long as the excitation current source 17 remains unchanged, the initial peak magnitude of short circuit current is determined by the transient reactance of the alternator (more precisely, the direct axis transient reactance) and the reactance in the current path between the alternator armature windings and the traction motor whose commutator flashed. The time constant of the ensuing current decay is determined by the electrical inductance and resistance in the path of the excitation current. As soon as the above-described breakover device 69 begins conducting, the effective resistance in parallel with winding 12F is much reduced (resistor 68 has a value of about 2 ohms in one embodiment) and this time constant becomes significantly smaller and excitation current will very rapidly decay toward zero since the available current (energy) from capacitor 72 is very small. In effect, the reactance of the alternator rapidly increases from its initial relatively low transient value (which is no more than approximately 30% of the machine's steady state synchronous reactance) to the value of its synchronous reactance, and the armature current magnitude is decreased correspondingly. If the excitation current source is quickly decoupled from the field 12F as described, the output current of the alternator 12 will begin to decrease from its initial surge before reaching the maximum available short-circuit magnitude. In one application of the invention, peak short circuit current to a faulted motor has been limited to approximately 18,000 amperes in a propulsion system capable of supplying 60–70,000 amperes or more without this improved flashover protection means, and the electrical energy in the faulted motor circuit has been limited to about 25% of what it would otherwise be.

Figure 6:
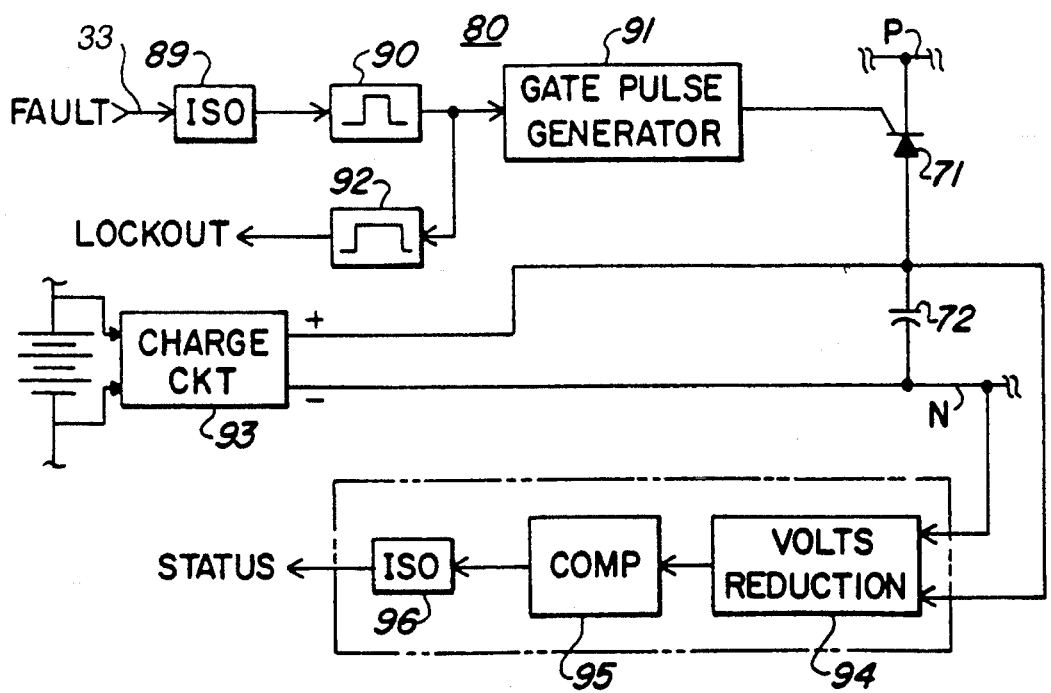
FIG. 6 is an expanded block diagram of the SCR control of FIG. 5.

The SCR valve 71 in the circuit means 70 is gated into conduction in response to a fault signal such as a high current signal detected by the circuit of FIG. 4. Referring to FIG. 6, the gating signal to valve 71 is shown to be generated in response to the FAULT signal from FIG. 4 by SCR control 80. The signal FAULT is coupled to a monostable multivibrator device (commonly referred to as a "one-shot" multivibrator) 90 through an optical isolator 89. Device 90 produces an output pulse having a predetermined time duration, e.g., 45 microseconds. An exemplary device 90 is a hardware programmable type 4538 CMOS device. The output pulse is supplied to an SCR gate pulse driver 91 which conditions the signal into a form suitable for application to the gate electrode of valve 71 for gating valve 71 into conduction.

The device 90 output pulse is also coupled to another one-shot multivibrator device 92 which may also be a type 4538 CMOS integrated circuit. The device 92 produces an output pulse LOCKOUT of somewhat longer duration, e.g., 2 seconds, and is used to lock-out or prevent application of firing pulses to the rectifier 64 during the time period immediately following a fault current detection. The output pulse from device 91 is coupled to the propulsion system controller 26 which controls application of gating or firing pulses to rectifier 64. The SCR control 80 also includes apparatus for establishing the preselected voltage charge on capacitor 72. In one form, the charging apparatus may comprise a conventional battery charger 93 connected to receive battery voltage (typically 45–90 volts) and to step the battery voltage to a higher value, e.g., the aforementioned 440 volts, for charging capacitor 72. The voltage on capacitor 72 may also be monitored to provide a STATUS signal indicating whether or not the protection circuit is operative. The STATUS signal may be merely an alarm or it may be used to disable the alternator power circuit. In FIG. 6, voltage conditioning circuit 94 is coupled to capacitor 72 to reduce the sensed voltage to a logic level suitable for application to a voltage comparator 95. Comparator 95 provides a logic signal of one sense, e.g., a logic 1, if the voltage on capacitor 72 exceeds a minimum voltage, e.g., 389 volts, and provides a logic signal of another sense, e.g., a logic 0, if the capacitor voltage is less than or equal to the minimum voltage of the exemplary voltage of 389 volts. An optical isolator 96 is used to isolate the voltage monitoring circuit from the controller 26.

Figure 5A:
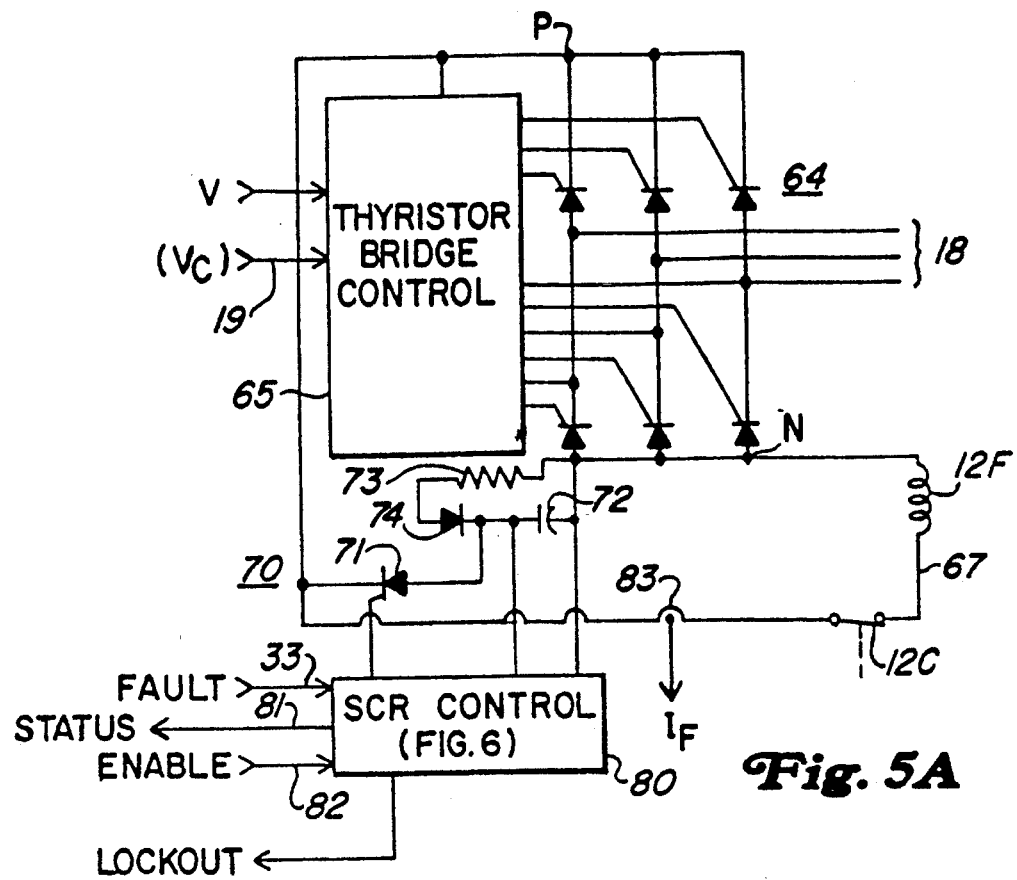
FIG. 5A is an expanded diagram of the generator excitation current source of FIGS. 1 and 3 for an a-c electric traction motor.

The circuit of FIG. 5 is preferably used in a propulsion system using d-c electric traction motors, which system conventionally includes the voltage breakover device 69 and series resistor 68. In a propulsion system using a-c electric traction motors, the transient suppression circuit comprising breakover device 69 and series resistor 68 are not commonly used. Accordingly, it is necessary to provide another power dissipation circuit to absorb reactive power from winding 12F and capacitor 72. In FIG. 5A, this function is provided for an a-c propulsion system by a diode 73 and series connected resistor 74. The diode 73 has a cathode terminal connected to the junction intermediate capacitor 72 and valve 71 while the resistor 74 connects the anode terminal of diode 73 to an opposite terminal of capacitor 72.

In the operation of the system of FIG. 5A, detection of a fault current caused by a shoot-through fault triggers SCR valve 71 in the same manner as in FIG. 5 and the charge on capacitor 72 again commutates rectifier 64 off by supplying current to field winding 12F. As the current circulates through winding 12F and capacitor 72, it begins charging capacitor 72 towards a reverse polarity. When the voltage across capacitor 72 reaches a slightly negative value, e.g., about −1 volts, diode 73 becomes forward biased thereby coupling resistor 74 in circuit with winding 12F. Resistor 74 has a low value, e.g., about 0.65 ohms, and provides a low impedance discharge path to rapidly dissipate energy from winding 12F. The response characteristic of the system of FIG. 5A has a characteristic to that shown in FIG. 7 for FIG. 5 and the end result is the same, i.e., field current is quickly interrupted such that shoot-through current is held to a non-destructive level. For the circuit of FIG. 5A, the characteristic exhibits approximately the same applied peak voltage to commutate the rectifier 64 off but has a higher peak negative voltage and appears decay exponentially with some super imposed a-c ringing on the decaying waveform. For example, the peak fault current, for a worst case condition, is limited to about 18000 amperes for d-c locomotives whereas the peak current without the fault current protection of FIGS. 5 or 5A can be as high as 40000 amperes. Further, for a-c locomotives, the time duration and energy content of the fault current is significantly reduced by the fault current protection circuit.

Figure 10:
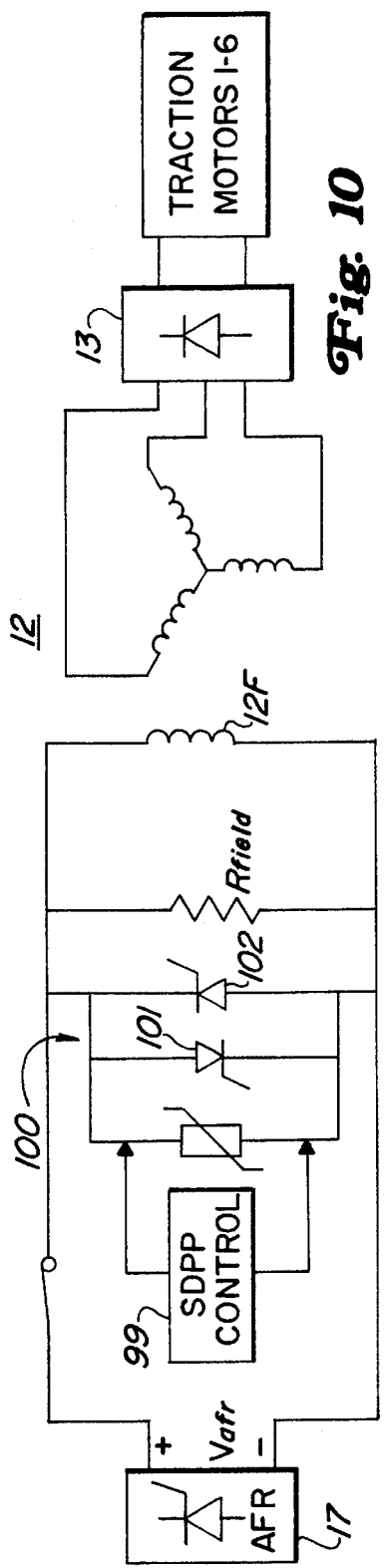
FIG. 10 is a simplified propulsion system schematic incorporating shorted rectifier diode protection.

Referring to FIG. 8, which is a simplified representation of FIG. 1, and to FIG. 9 which illustrates a corresponding propulsion system using a-c electric traction motors, the alternator 3-phase stator circuit feeds a 3-phase full-bridge rectifier 13. This rectifier also contains fuses F which function as protective devices, i.e., they protect the alternator from over-voltages, and they blow open when a rectifier fails (a rectifier usually fails short). The d-c voltage and current from the rectifier 13 is used to power d-c traction motors 15,16, etc. in a "d-c locomotive") and inverters 96,97, etc. which then power a-c squirrel-cage induction motors 15A,16A in an "a-c locomotive"). Both types of locomotives (d-c and a-c) require the main rectifier fuses or another type of protection scheme. The fuses are often a maintenance problem, since they last only about 3.27 years in the most severe locomotive conditions (e.g., pulling coal up a steep grade; i.e. low speed, maximum power, and at the highest output rectifier currents). When a fuse blows, the locomotive has to operate at a reduced horsepower or none at all (depending on if it is a d-c or an a-c locomotive). It has been discovered that the power fuses may be eliminated by instead clamping the resulting field currents at the ports of the alternator's field during a shorted diode fault. More specifically, a shorted diode in the rectifier 13 (with no fuses) can be modelled by a quasi-current source creating an a-c current signal sourced from the alternator's field. The only way to prevent high voltages and the resulting field insulation breakdown of the rotor circuit is to provide a very low impedance path for these bidirectional currents until the engine speed is reduced to low-idle (lowest speed) and the rotors's d-c voltage and current is removed. FIG. 10 illustrates an electronic device 100 comprising antiparallel SCRs that fire when an included detection control card 99 determines a valid shorted diode condition in locomotives where the fuses are eliminated. The detection scheme is attached to the alternator's field circuit as are the antiparallel SCRs. When these SCRs fire they provide a very low impedance path for the reflected a-c field currents until the system controller can reduce the engine speed to low-idle. The end result is that the only time a locomotive fails due to a rectifier circuit failure is when there is a true shorted diode since the nuisance failures of the fuses are now eliminated.

The present invention allows the removal of the rectifier fuses in the d-c locomotives and allows the design of the a-c locomotive without fuses. As mentioned above the fuses can have a short life span. This high failure rate is multiplied by the fact that in a 6-axle (6 d-c traction motors) locomotive there are a total of 18 fuses. In a 4-axle (4 d-c traction motors) locomotive there are 12 fuses. For the case of 18 fuses and each fuse fails in 3.27 years, this leads to a worst case average of 1 failure every 2 months and 5 days. In practice, of course, most locomotives will not be this severe. However, the fuses are far from attaining a twenty year life.

When a rectifier diode in power rectifier 13 fails short and there are no fuses in the rectifier assembly, an a-c current is induced into the field circuit of the traction alternator 12. This current is really a quasi-current source, i.e., if a short is placed across the field 12F, the current will flow at a frequency which is the same as the stator frequency. This frequency is related to the engine speed which is mechanically coupled to the alternator. If no short is provided, the current produces a severe overvoltage on the field but is limited by the isolation breakdown characteristics in the field. This current source can have a peak value of 3000 amperes when shorted. If these currents were not allowed to flow through a very low impedance path, the resulting over-voltages would break down the insulation in the rotor circuit as mentioned above and could cause permanent mechanical and electrical damage to the alternator and surrounding electrical and mechanical support systems.

Figure 11:
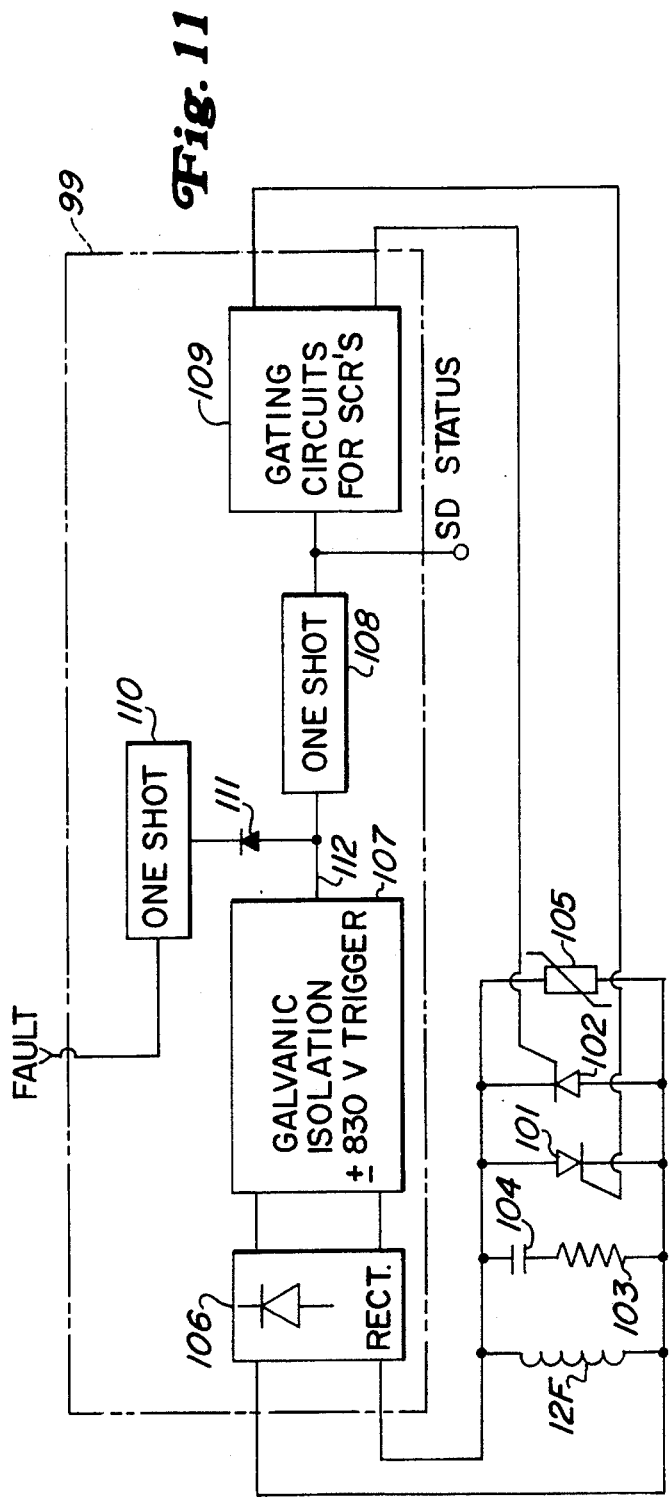
FIG. 11 illustrates further elements of the protection circuit of FIG. 10.

The present invention provides a protection means for establishing such a low impedance path whenever a shorted diode in the rectifier circuit 13 creates a reflected a-c current in the alternator field winding 12F. In a preferred form, the protection means comprises a pair of parallel connected, reversely poled SCR's connected in shunt with field winding 12F. Referring to FIGS. 10 and 11, SCR's 101 and 102 are connected in parallel across field winding 12F. A snubber circuit comprising series connected resistor 103 and capacitor 104 are also connected across winding 12F along with a thyrite 105. The snubber circuit limits the rate of voltage change on the SCR's during transition from one state to another. Voltage across winding 12F is detected by a rectifier circuit 106 connected to winding 12F. The rectified output of rectifier 106 is coupled to a bi-lateral trigger circuit 107 which produces an output signal, such as a logic 0 to logic 1 transition, whenever the rectified voltage exceeds a preselected magnitude, e.g., 830 volts. The signal from circuit 107 is coupled to a one-shot multivibrator 108, such as a type 4538, which produces a pulse output signal of preselected duration, for example, one second. Circuit 107, preferably includes an optical isolator between it and the multivibrator 108.

The pulse output signal of multivibrator 108 is applied to a conventional SCR gating circuit 109 which provides gating signals to SCR's 101 and 102 during the time duration of the multivibrator pulse output signal. In response to the gating signals, whichever one of the SCRs 101,102 that is forward biased will begin conduction and establish a short circuit current path in parallel with winding 12F. As will be appreciated, the rectifier circuit 106 detects reflected a-c current in field winding 12F when a shorted diode creates an a-c current path in the alternator output circuit. The thyrite 105 is used to dissipate transient energy if the reflected a-c voltage does not reach the preselected trigger magnitude, i.e., ±830 volts.

The pulse output signal from multivibrator 108 is also supplied as a shorted diode (SD) STATUS signal to the system controller 26. The system controller can be programmed to take various corrective actions in response to a shorted diode detection. In one example, the controller 26 logs the fault and then allows a re-start of the power system. If a second contiguous fault is then detected, the controller locks the system off-line. At the same time, the engine speed is reduced to low-idle, i.e., the lowest engine speed of a running diesel engine. While engine speed is being reduced, the SD detection circuit continues to function as necessary to prevent damage to the alternator field.

Shorted diode detection can be used in both a-c and d-c electric traction motor propulsion systems. It is also used in combination with fault current detection, either from a flashover (d-c system) or a shoot-through (a-c system). When combined with fault current protection, it is desirable to disable the shorted diode circuit when a fault current is detected. More particularly, if the SCR's 101,102 were triggered during a fault current condition, the capacitor 72 would be short-circuited and unable to commutate off the rectifier 64. The shorted diode circuit is disabled by coupling the FAULT signal from the fault current detection circuit (FIGS. 5,5A) to a one-shot multivibrator 110 which may be a type 4538 CMOS device. The device 110 produces a pulse output of fixed duration, e.g., 200 milliseconds, transitioning from a logic 1 to a logic 0 level. The pulse output is coupled through a diode 111 to the signal line 112 coupled between trigger circuit 107 and multivibrator 108. This signal clamps line 112 to a low value and prevents triggering of multivibrator 108.

In general, the protection systems operate essentially in the same manner whether the propulsion system is for d-c traction motors or a-c traction motors. One area of difference is in the corrective action to be taken. In the case of a flashover of a d-c motor, the motor may "heal" itself after being run for some time without power. Accordingly, the controller 26 will normally lock out power to a flashed motor for a selected time, e.g., fifteen miles, and then reapply power. In the case of a shoot-through, the controlled rectifier has failed and the controller 26 may lock out operation of the associated inverter. Typically, each a-c traction motor is coupled to a separate inverter and such lock out merely disables one motor.

Having described the presently preferred embodiment of the alternator excitation current source 17 as it is shown in FIGS. 5–7, the remainder of the improved fault current protection means will now be described with reference again to FIG. 3. The status signal on the output line 81 of the source 17 is coupled via the data link 21 to the controller 26. As soon as the normally low signal on the output line 33 of the fault current detecting means 32 goes high due to a flashover occurring on the commutator of one or more of the traction motors 15,16, etc., or a shoot-through in one of the inverters 96,97, etc. The GTO control means 80 in the excitation current source 17 simultaneously applies a turn-on signal to the GTO valve 71 and removes the normally high status signal on the line 81. This high-to-low change of the status signal initiates two functions in the controller. The first function, represented in FIG. 3 by a block 140 which is supplied with the family of motor armature current feedback signals I1,I2, etc., identifies any traction motor in which the magnitude of armature current exceeds a predetermined high threshold whenever the status signal changes from high to low or the inverter experiencing a similar current. The latter threshold (e.g., approximately 3,000 amps) is greater than the maximum magnitude of armature or inverter current under all normal conditions. The identifying function 140 is suitably programmed to read the magnitudes of the current feedback signals, to compare each one with a value corresponding to the aforesaid threshold, and to store the identification number ("#X") 6f any traction motor(s) (or inverter) whose current is higher than such threshold. Motor #X is presumed to be experiencing a flashover. The identification of the faulted motor is available on an output line 141 of the block 140.

Figure 3:
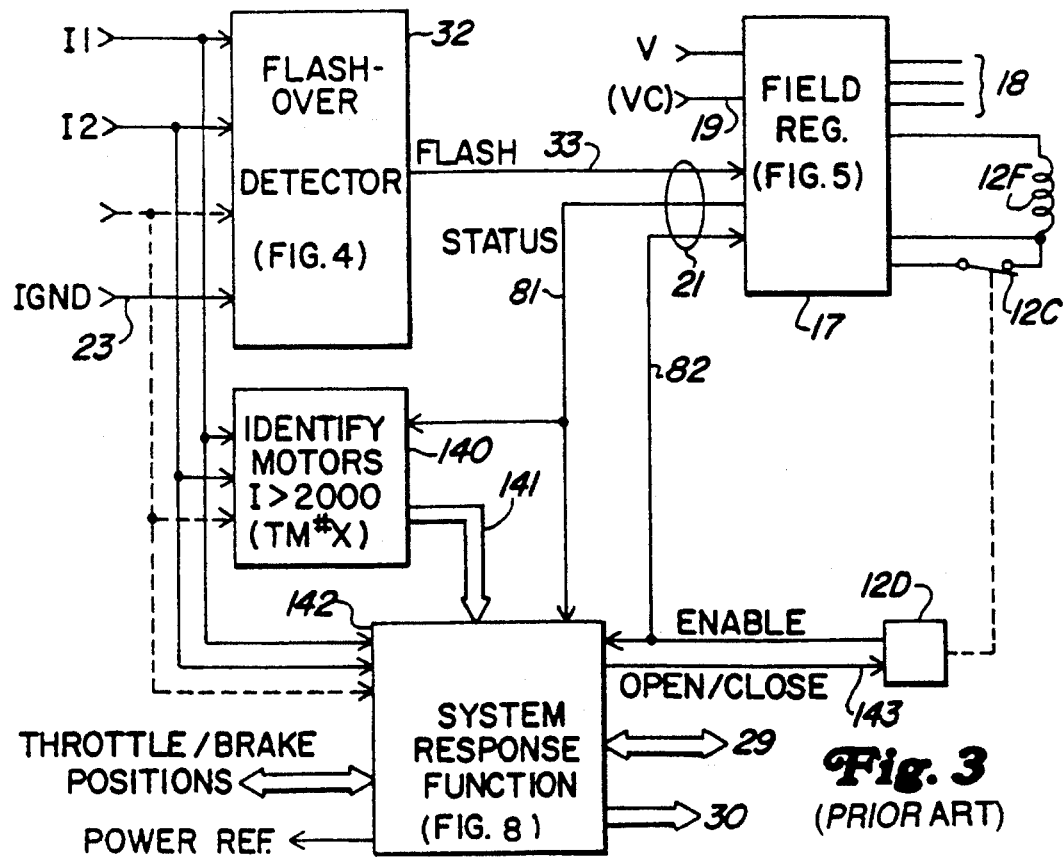
FIG. 3 is an expanded block diagram of certain parts of the controller that cooperate with the generator excitation source to implement the present invention.

The other function initiated by a status change is represented in FIG. 3 by a block 142 labeled "system response function." It is suitably arranged to command the following actions in a d-c locomotive in immediate response to any high-to-low change of the status signal on line 81; the speed call signal for the engine governor system 25 is changed to its idle value; the power reference value in the excitation control means of the controller 26 is reset to zero, thereby temporarily imposing a value corresponding to IF=O on the control signal VC; a flashover message is entered in the display module 30, and the identification of the faulted motor(s) is logged; an "open" command is transmitted via a line 143 to the field switch control means 12D so as to de-energize 12D which enables the operating mechanism of the contact 12C to move this contact from its normal, closed position to its alternative, open position; contactor opening commands are issued for all of the motor contactors 15C, 16C, etc.; each of these opening commands is transmitted to the opening means 29 of the motor contactors as soon as armature current in the corresponding motor has decreased to a predetermined level that can be safely interrupted by the associated contactor without untoward arcing or welding (but no later than five seconds after the opening commands are issued); and a "flash timer" is activated. As a result of these actions, the firing signals for the controlled rectifier bridge 64 in the excitation source 17 are retarded so that the output voltage of this bridge is soon reduced to zero, the field switch contact 12C in the excitation current path is opened (although the alternator field 12F may continue to be excited by residual current circulating through the resistor 68 and the breakover device 69), and all of the traction motors are disconnected from the d-c bus 14 of the propulsion system. Whenever a flashover is detected, the quick response of the solid-state controllable valve 71 in the excitation current path will cause the alternator output current to decrease very rapidly from its initial surge as previously explained. Consequently, the respective motor currents decrease rapidly, and the time delay between issuing and transmitting contactor opening commands is relatively short. Note that when opening commands are received by the control means 12D and the operating means 29, respectively, the contact tips of the field switch and motor contactors will not separate immediately due to inherent time delays (e.g., approximately 180 milliseconds) in the operation of these electromechanical devices. By the time the contactor in series with the faulted motor is open, the flashover is extinguished and the fault signal on the output line 33 of the flashover detector 32 is removed. The aforesaid enable signal, which is supplied via the line 82 from the field switch control means 12D to the control means 80 in the excitation current source 17, will have a low state so long as the field switch contact 12C is open.

In the case of an a-c locomotive, essentially all of the above enumerated steps are duplicated except that the message identifies a shoot-through of an inverter rather than a motor flashover and the system locks out the inverter from further operation.

After the actions described in the preceding paragraph are completed, the system response function 142 will command several additional actions; contactor closing commands are transmitted to the operating means 29 of the motor contacts so as to reclose all of the contactors 15C,16C, etc. except the one(s) associated with the faulted traction motor(s) (i.e., motor #X) as identified by the previously described function 140; a "close" command is transmitted via the line 143 to the field switch control means 12D so as to energize 12D and thereby cause it to return the contact 12C to its closed position; and the engine speed call signal is permitted to return to a value determined by the position of the throttle 27. As soon as the control means 12D receives the close signal on line 143, the enable signal on line 82 changes from low to high states. As a result of removing the idle value restriction on the speed call signal and reclosing the field switch contact 12C the alternator excitation current will ramp up to a desired steady-state magnitude, and the electric power that the main alternator 12 now reapplies to the unfaulted traction motors will increase smoothly to whatever level is determined by the throttle position. After a delay determined by the flashover timer in the system response function 142, the operating means 29 is permitted to reclose the contactor associated with motor #X, such reclosure actually occurring the next time the throttle handle is moved through its idle position. If the locomotive speed is relatively high (e.g., 60 miles per hour or more) when a flashover occurs, as is usually true, the delay time is so computed as to obtain a certain number of commutator revolutions, whereby the flashed commutator will be cleaned by the brushes riding over its surface as the rotor of the de-energized motor #X continues to be turned by the locomotive axle to which it is coupled.

Figure 12:
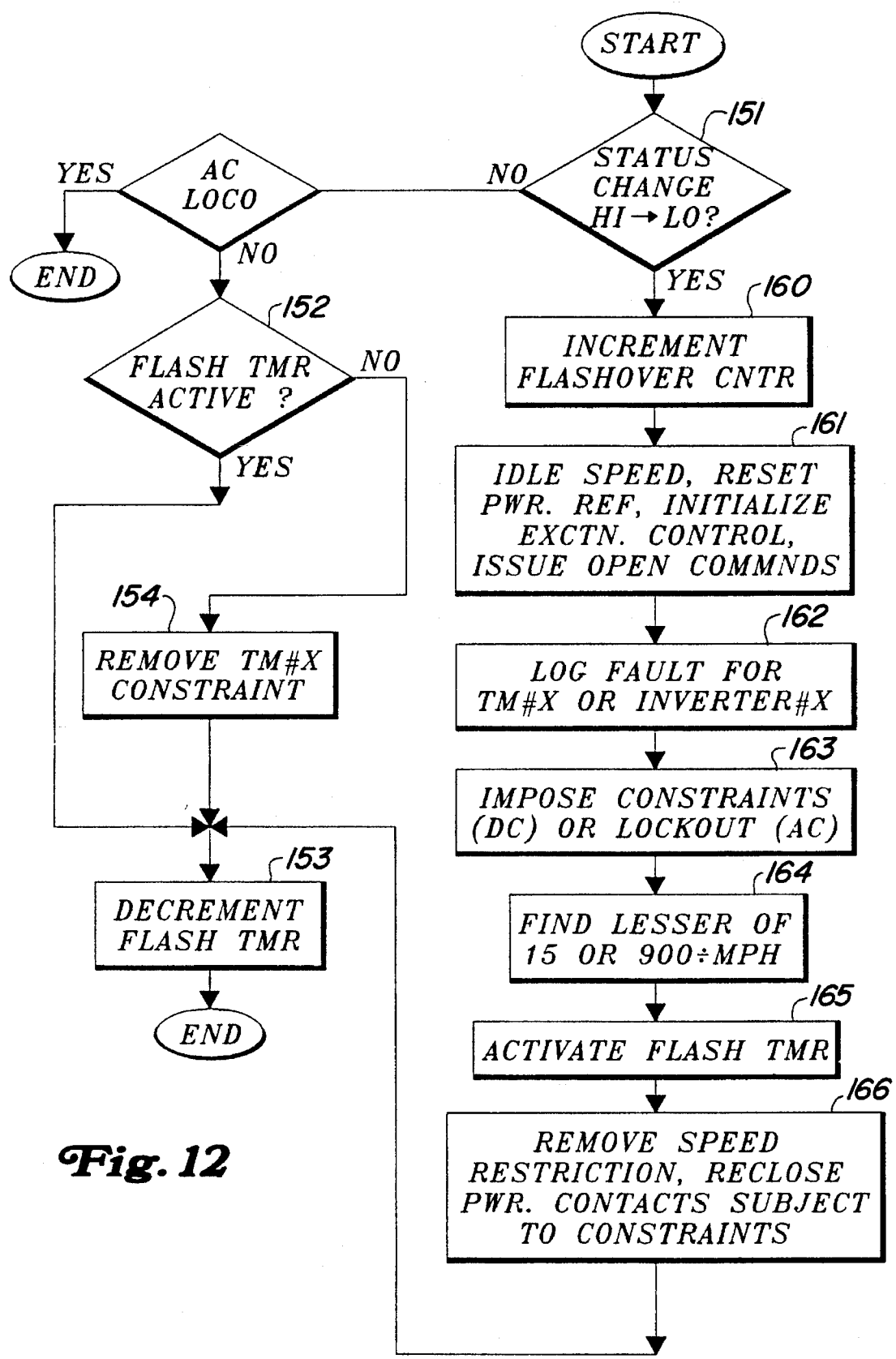
FIG. 12 is a flow chart explaining operation of the fault current protection system.

Although the system response function could be implemented in a variety of different ways to obtain the results summarized above, the presently preferred way is to program the controller 26 to execute the routine that is illustrated in FIG. 12. This routine is repeated once every ten milliseconds. It begins with an inquiry 151 to determine whether or not the status signal on line 81 has changed from high to low. If not, the routine for a d-c motor locomotive, proceeds to a second inquiry 152 to determine whether or not a flash timer is active. For an a-c motor locomotive, the routine ends at this point. If the answer is affirmative, the next and final step 153 in this routine is to decrement the flash timer by one. Otherwise the routine proceeds from inquiry 152 to the step 153 by way of an additional step 154 that removes any constraint that may be preventing reclosure of the motor contactor associated with a previously faulted traction motor #X. After such constraint has been removed, such contactor can be reclosed by the operating means 29 whenever commanded by the controller 26.

If the answer to the first inquiry 151 were affirmative, the FIG. 12 routine would proceed from this inquiry to the final step 153 by way of a series of steps 160–66 that will now be described. In step 160 a flashover counter is incremented by one. The next step 161 is to change the engine speed call signal to its idle value, to reset the power reference value to zero, to initialize other variables in the excitation control, and to issue opening commands for the field switch control means 12D and the motor contactor operating means 29. (Note that the relevant time constants of the engine fuel system, the alternator field excitation circuit, and their respective controls are such that the alternator output power responds relatively slowly to the execution of step 161, too slowly to be relied on to keep the initial surge of current in the faulted motor from attaining a potentially damaging magnitude.) Step 161 is followed by step 162 in which the identify of the faulted traction motor(s) or faulted inverter(s) is fetched from the function 140 (FIG.3) and then entered in the display module 30. This same information is used in step 163 to impose a reclosing constraint on the contactor(s) associated with such motor(s).

In the next step 164, the FIG. 8 routine computes a certain initial count corresponding to a time delay that is the lesser of 15 minutes or of 900 divided by the actual locomotive speed in units of miles per hour. Then in step 165 the flash timer is activated by loading a register of the microcomputer with the initial count found in the previous step. The flash timer remains active only so long as the count in this register does not reach zero. The initial count is sufficiently large so that he count stored in the register, when decremented at the rate of 100 per second, will reach zero upon expiration of the aforesaid maximum length of time (e.g., 15 minutes) or sooner if the locomotive speed was greater than 60 mph when the initial count was computed. The next step 166 is executed as soon as position sensors in the contactor operating means 29 indicate that all of the motor contactors 15C,16C, etc. have opened in response to the opening commands issued in step 161. It removes the idle value restriction from the speed call signal, issues a closing command to the field switch control means 12D, and issues commands to the operating means 29 for closing all of the contactors 15C,16C, etc. except the one(s) associated with the faulted motor(s) #X whose reclosing is prevented so long as the constraint imposed in step 163 is active. The last-mentioned constraint is active until removed by the execution of step 154.

While a preferred embodiment of the invention has been shown and described by way of example, many modifications will undoubtedly occur to persons skilled in the art. For example, the conventional field switch 12C,12D could be omitted and the valve 71 could be suitably controlled to perform all of its usual functions. In addition, the thyristor bridge 64 in the alternator excitation current source 17 could be replaced with a diode rectifier bridge, in which case the SCR valve 71 would be controlled to operate normally as a switching regulator element so as to regulate the average magnitude of alternator field current as desired. The concluding claims are therefore intended to cover all such modifications that fall within the true spirit and scope of the invention.

What is claimed is:

1. A shorted diode protection system for a traction vehicle propulsion system including at least one electric traction motor, a synchronous generator having armature and field windings, a controllable source of excitation current connected to the field windings, and electric power conditioning means interconnecting the armature windings to the traction motor, the power conditioning means including a bridge rectifier circuit for converting alternating current from the armature windings to direct current on a pair of relatively positive and negative output buses, the system comprising:

detecting means for producing a gating signal in response to a reflected alternating current voltage appearing on the field windings in excess of a preselected magnitude;

at least one solid-state controllable electric valve connected in parallel circuit arrangement with the field windings, said valve being normally non-conducting and being switchable to a conducting state by said gating signal applied to a gate terminal thereof; and means coupling said gating signal to said valve to limit the voltage on the field winding.

2. The shorted diode protection system of claim 1 and including a second controllable solid-state electric valve connected in parallel with said at least one valve, each of said valves being unidirectional devices and being coupled in inverse relationship.

3. The shorted diode protection system of claim 2 wherein each of said valves comprises an SCR.

4. The shorted diode protection system of claim 3 and including a thyrite connected in parallel with said field winding for dissipating transient voltages of less than said preselected magnitude.

5. The shorted diode protection system of claim 3 and including a snubber circuit coupled in parallel with the SCRs.

6. The shorted diode protection system of claim 1 wherein said detecting means comprises a solid-state rectifier circuit coupled to said field windings and adapted to produce a d-c voltage output proportional to an a-c voltage component on said field windings, a trigger circuit for producing a trigger pulse when the d-c voltage exceeds a preselected value, and means responsive to said trigger pulse for generating the gating signal for a predetermined time duration.

7. The shorted diode protection system of claim 6 wherein the means for generating the gating signal comprises a monostable multivibrator responsive to said trigger pulse for generating a signal of said predetermined time duration and a gate signal generator responsive to said multivibrator signal for supplying gating signals to said valve during the time duration of said multivibrator signal.

8. The shorted diode protection system of claim 1 and including:
   means for detecting a fault current in said armature windings;
   means connected in circuit with said field winding for commutating off said controllable source of excitation current upon detection of said fault current;
   means selectably connectable in circuit with said field winding for dissipating energy therein subsequent to commutation of said excitation source; and
   means for inhibiting operation of said detecting means for producing a gating signal upon detection of the reflected alternating current voltage on the field windings in excess of a preselected magnitude.

9. The shorted diode protection system of claim 1 and including:
   means for detecting a fault current in said armature windings;
   means connected in circuit with said field winding for commutating off said controllable source of excitation current upon detection of said fault current;
   means selectably connectable in circuit with said field winding for dissipating energy therein subsequent to commutation of said excitation source; and
   means for inhibiting operation of said fault current detecting means upon detection of the fault current.

10. A method of protecting a synchronous generator from a reflected overvoltage condition in a system in which the generator has a field winding connected to a source of controllable excitation current and armature windings connected to a bridge rectifier for supplying direct current (dc) electric power, the reflected overvoltage being caused by a short-circuit condition in the rectifier causing a reflected alternating current to appear on the field winding, the method comprising the steps of:
   developing an output voltage representative of an alternating current voltage on the field winding;
   detecting when the alternating current voltage exceeds a preselected maximum magnitude and generating a fault signal in response thereto; and
   short-circuiting the field winding in response to the fault signal while continuing to energize the bridge rectifier from the armature windings.

11. The method of claim 10 wherein the step of short-circuiting includes the steps of:
   connecting a solid-state controllable electric switch in parallel with the field windings; and
   gating the switch into conduction for a predetermined time duration.

12. The method of claim 11 wherein the switch comprises a pair of inversely connected SCR's and the step of gating comprises applying gate pulses to gate terminals of the SCR's for the predetermined time duration.

13. The method of claim 12 and including the steps of:
   monitoring the armature windings for an overcurrent condition;
   connecting commutating means across the field windings in response to a monitored overcurrent; and
   inhibiting application of gate pulses to the SCR's during the overcurrent condition.

14. The method of claim 13 wherein the bridge rectifier is coupled to supply d-c electric power to at least one solid-state inverter, the inverter having a plurality of controllable electric valves for converting the d-c power to a-c power at a selected frequency, and wherein the step of monitoring includes the step of detecting overcurrent through the inverter from a shorted valve.

15. The method of claim 12 and including the step of dissipating transient voltage on the field through a thyrite coupled in parallel with the field windings.

* * * * *